US006492986B1

(12) United States Patent
Metaxas et al.

(10) Patent No.: US 6,492,986 B1
(45) Date of Patent: Dec. 10, 2002

(54) METHOD FOR HUMAN FACE SHAPE AND MOTION ESTIMATION BASED ON INTEGRATING OPTICAL FLOW AND DEFORMABLE MODELS

(75) Inventors: Dimitris Metaxas; Douglas DeCarlo, both of Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 09/920,102

(22) Filed: Aug. 1, 2001

Related U.S. Application Data (63) Continuation of application No. 09/088,236, filed on Jun. 1, 1998
(60) Provisional application No. 60/048,298, filed on Jun. 2, 1997.

(51) Int. Cl.$^7$ .............................................. G06T 17/00
(52) U.S. Cl. ...................................... 345/420; 345/474
(58) Field of Search ................................ 345/420, 474, 345/475, 619

(56) References Cited

U.S. PATENT DOCUMENTS 5,754,181 A     5/1998   Amdursky et al. ......... 345/419

OTHER PUBLICATIONS

Terzopoulos, et al., "Analysis and Synthesis of Facial Image Sequences Using Physical and Anatomical Models", *IEEE Transactions on Pattern Analysis And Machine Intelligence*, 1993, 15(6), 569–579.
Esa, et al., "Facial Expression Recognition Using A Dynamic Model and Motion Energy", *Proceedings —Fifth International Conference on Computer Vision*, 1995, 360–367.
Yacoob, et al., "Computing Spatio –Temporal Representations of Human Faces", *IEEE Computer Society Society Conference on Computer Vision and Pattern Recognition*, 1994, 70–75.
Black, et al., "Tracking and Recognizing Rigid and Non- –Rigid Facial Motions Using Local Parametric Models of Image Motion", *Proceedings —Fifth International Conference on Computer Vision*, 1995, 374–381.
Li, et al., "3–D Motion Estimation in Model–Based Facial Image Coding", *IEEE Transactions on Pattern Analysis and Machine Intelligence*, 1993, 15(6), 545–555.
Metaxas, et al., Shape and Nonrigid Motion Estimation Through Physics–Based Synthesis, *IEEE Transactions on Pattern Analysis and Machine Intelligence*, 1993, 15(6), 580–591.
Simoncelli, et al., "Probability Distributions of Optical Flow", *IEEE Computer Society Conference on Computer Vision and Pattern Recognition*, 1991, 310–315.
Yuille, et al., "Feature Extraction From Faces Using Deformable Templates", *International Journal of Computer Vision*, 1992, 8(2), 99–111.

(List continued on next page.)

*Primary Examiner*—Mark Zimmerman
*Assistant Examiner*—Mano Padmanabhan
(74) *Attorney, Agent, or Firm*—Woodcock Washburn LLP (57) ABSTRACT

A method and apparatus for human face shape and motion estimation based on integrating optical flow and deformable models is disclosed. The optical flow, constraint equation provides a non-holonomic constraint on the motion of the deformable model. Forces computed from edges and optical flow are used simultaneously. When this dynamic system is solved, a model-based least-squares solution for the optical flow is obtained and improved estimation results are achieved. The use of a 3-D model reduces or eliminates problems associated with optical flow computation. This approach instantiates a general methodology for treating visual cues as constraints on deformable models. The model uses a small number of parameters to describe a rich variety of face shapes and facial expressions.

18 Claims, 9 Drawing Sheets

OTHER PUBLICATIONS

DeCarlo et al., "Blended Deformable Models", *Proceedings —IEEE Computer Society Conference on Computer Vision and Pattern Recognition*, 1994, 566–572.

60/048,298 —U.S. Provisional Pat. application, filed Jun. 2, 1997. (DeCarlo, et al., "The Integration of Optical Flow and Deformable Models with Applications to Human Face Shape and Motion Estimation", *Proceedings —IEEE Computer Society Conference on Computer Vision and Pattern Recognition*, 1996, 231–238).

Agrawala et al., "Model–based motion estimation of synthetic animations," *ACM Multimedia 95 —Electronic Proceedings*, Nov. 1995.

Beauchemin et al., "The computation of optical flow," *ACM computing Surveys*, Sep. 1995, 27(3).

Giachetti et al., "Optical flow and deformable Objects," 0–8186–7042–8/95, Nov. 1995.

Giachetti et al., "Dynamic seqmentation of traffic scences," *Proceedings of the Intelligent Vehicles '95 Symposium*, ISBN 0–7803–2983–X, Sep. 1995.

Pan, et al., "Adaptive estimation of optical flow from general object motion," ACM–0–89791–502–x/92/0002/0489, 1992.

Reinders, et al., "Facial feature localization and adaptation of a generic face model for model–based coding," *Signal Proceeding: Image Communication*, 1995, 7, 57–74.

Figure 1: Sample 2-D vector fields $L_p(u)$

Figure 2: The deformable face model

Figure 3: Scaling and bending deformations

Figure 4: Example deformations affecting the nose

Figure 5: Face motion and expression deformations

Figure 6: Likely face features in an image

Figure 7: Model initialization

Figure 8: A motion tracking example

Figure 9: A motion and expression tracking example

Figure 10: Another motion and expression tracking example

METHOD FOR HUMAN FACE SHAPE AND MOTION ESTIMATION BASED ON INTEGRATING OPTICAL FLOW AND DEFORMABLE MODELS

CROSS-REFERENCE TO RELATED APPLICATION

This application is a continuation of U.S. application Ser. No. 09/088,236 filed Jun. 1, 1998.

This application is a continuation of U.S. application Ser. No. 60/048,298, filed Jun. 2, 1997.

FIELD OF THE INVENTION

The present invention relates to human face shape and motion estimation. More particularly, the present invention relates to such estimation based on integrating optical flow and deformable models.

BACKGROUND OF THE INVENTION

A wide variety of face models have been used in the extraction and recognition of facial expressions in image sequences. Several 2-D face models based on splines or deformable templates have been developed which track the contours of a face in an image sequence. Terzopoulos and Waters ("Analysis and synthesis of facial image sequences using physical and anatomical models," *IEEE Pattern Analysis and Machine Intelligence*, 15(6):569–579, 1993) and Essa and Pentland ("Facial expression recognition using a dynamic model and motion energy," in *Proceedings ICCV '95*, pages 360–367, 1995) use a physics-based 3-D mesh with many degrees of freedom, where face motion is measured in terms of muscle activations. Edge forces from snakes are used in the former, while in the latter, the face model is used to 'clean up' an optical flow field that is used in expression recognition.

Another approach is to directly use the optical flow field from face images. Yacoob and Davis ("Computing spatio-temporal representations of human faces," *Proceedings CVPR '94*, pages 70–75, 1994) use statistical properties of the flow for expression recognition. Black and Yacoob ("Tracking and recognizing rigid and non-rigid facial motions using local parametric models of image motion," *Proceedings ICCV '95*, pages 374–381, 1995) parameterize the flow field based on the structure of the face under projection. Addressing the problem of image coding, Li, et al. ("3-D motion estimation in model-based facial image coding," *PAMI*, 15(6):545–555, Jun. 1993) estimate face motion using a simple 3-D model by a combination of prediction and a model-based least-squares solution to the optical flow constraint equation. A render-feedback loop is used to combat error accumulation in tracking.

However, none of these approaches permits large head rotations due to the use of a 2-D model or the inability to handle self-occlusion. Also, none of the previous work makes a serious attempt in extracting the 3-D shape of the face from an image sequence. At best, the boundary of face parts are located to align the model with an image. Finally, none of the previous face tracking work integrates multiple cues in the tracking of the face.

Accordingly, a system is desired which uses a 3-D model and allows the tracking of large rotations by using self-occlusion information from the model. A system is also desired which extracts the shape of the face using a combination of edge forces and anthropometry information. Moreover, a system is desired which can easily augment the optical flow solution with additional information to improve such solution and which permits the use of a small number of image points to sample the optical flow field, as well as the computation of edge forces to prevent error accumulation in the motion. The present invention has been developed to meet these needs in the art.

SUMMARY OF THE INVENTION

The present invention satisfies the aforementioned needs by providing a method and apparatus for human face shape and motion estimation based on integrating optical flow and deformable models. The optical flow, constraint equation provides a non-holonomic constraint on the motion of the deformable model. Forces computed from edges and optical flow are used simultaneously. When this dynamic system is solved, a model-based least-squares solution for the optical flow is obtained and improved estimation results are achieved. The use of a 3-D model reduces or eliminates problems associated with optical flow computation. This approach instantiates a general methodology for treating visual cues as constraints on deformable models. The model, which applied to human face shape and motion estimation, uses a small number of parameters to describe a rich variety of face shapes and facial expressions.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF PREFERRED EMBODIMENTS

Certain terminology may be used in the following description for convenience only and is not considered to be limiting. The words "left", "right", "upper". and "lower" designate directions in the drawings to which reference is made. The words "inwardly" and "outwardly" are further directions toward and away from, respectively, the geometric center of the referenced object. The terminology includes the words above specifically mentioned, derivatives thereof, and words of similar import.

The present invention is based, in part, on the observation that the integration of cues such as optical flow into a model-based approach can yield a great improvement in the ability to estimate shape and motion and that a deformable model framework can be used to perform this integration. As one skilled in the art will appreciate, shape and motion estimation of the human face is useful in connection with sign language recognition, facial recognition, virtual reality applications, game applications, human-computer interaction applications, anthropological applications, biomedical applications, facial reconstruction applications, and the like. Face tracking and expression recognition have been addressed in recent years, and such research is motivated by applications such as human-machine interfaces. The present invention applies an augmented framework to face shape and motion estimation using a specially constructed three-dimensional model of the human face.

Optical flow provides information that can be used to constrain the motion of the face model. Previous attempts at using optical flow (or other data velocity information) in a deformable model framework apply forces to the model without enforcing a velocity constraint. Additional methods are required to allow the incorporation of optical flow as a constraint in a deformable model framework.

Accordingly, in the present invention, a system of optical flow constraint equations is re-written in terms of the parameters of a face model such that the image velocities in the optical flow constraint equation are identified with the projection of the model's three-dimensional velocity. The resulting system constrains the velocities of the parameters of the model. In the theory of dynamic systems, velocity constraints are called non-holonomic, since they cannot be integrated to determine the parameters of the model. Instead, the present invention solves this system by using the method of Lagrange multipliers, which converts the optical flow constraints into constraint forces that improve the estimation of the model. The constraint remains satisfied when these constraint forces are combined with other forces (such as edge-based forces). This process instantiates a general methodology for the integration of cues as constraints within a deformable model based approach.

This treatment of optical flow offers several advantages. It avoids the explicit computation of the optical flow field by instead using the optical flow constraint equation at select pixels in the image. Using the three-dimensional model, the present invention avoids choosing pixels on occlusion boundaries (which violate the optical flow constraint equation) by determining their probable locations in the image. Similarly, the present invention can determine likely locations of edges in the image to produce edge forces on the model. Problems with error accumulation associated with tracking are alleviated using these edge forces, which keep the model aligned with the face in the image. In the framework of the present invention, the addition of edge forces does not disturb the optical flow constraint.

The theory of dynamic systems is applied to the shape and motion estimation of human faces using a specially designed three-dimensional face model. The model, shown in FIGS. 2A–2C, includes the salient parts of the face (such as the mouth, nose and eyes). The shape is specified by a small number of parameters realized using a polygon mesh deformed by a carefully designed sequence of deformations. The motivation of the design comes from variabilities observed in data from face anthropometry measurements. This data is also used to create a reasonable initial model, and to keep the shape of the face consistent during the estimation process. The motion of the face (such as head motion or facial expressions) is specified using a small set of parameters. The Facial Action Coding System (FACS) is a system for describing facial movements in terms of 'action units', and motivates the design of the motions of the model. There are parameters for a variety of face motions such as opening of the mouth and raising of the eyebrows.

Deformable Model Dynamics

Deformable models are shapes specified by a set of parameters that deform based on a physical model due to forces. In vision applications, forces are determined from visual cues such as edges in an image. Physics provides additional mathematical tools and is a useful analogy for addressing problems such as shape and motion estimation.

The shape s of a deformable model is parameterized by a vector of values q and is defined over a domain $\Omega$ which can be used to identify specific points on the model and to provide its topological structure. The shape $s(u; q_s)$ with $u \in \Omega$ and parameters $q_s$ is allowed to translate and rotate so that a point on the model is given by:

$$x(u) = c + Rs(u, q_s) \tag{1}$$

where the model parameters $q = (q_c^T, q_\theta^T, q_s^T)^T \cdot q_c = c$ is the translation, and $q_\theta$ is the quaternion that specifies the rotation matrix R. For conciseness, the dependency of x on q is not explicitly written. For the applications discussed herein, the shape model used will be the deformable face model described below.

To distinguish the processes of shape estimation and motion tracking, we rearrange and separate the parameters q into those that describe the basic shape of the object ($q_b$), and its motion ($q_m$), so that $q = (q_b^T, q_m^T)^T$. In the face model, $q_b$ will contain the parameters that specify the shape of the face at rest (such as the width of the mouth), and $q_m$ will include $q_c$, $q_\theta$, and the parameters which specify the facial expressions.

Estimation of the model parameters is based on first order Lagrangian dynamics. As the shape changes, velocities of points on the model are given by:

$$\dot{x}(u) = L(u)\dot{q} \tag{2}$$

where $L = \partial x / \partial q$ is the model Jacobian as described by Metaxas and Terzopoulos, "Shape and nonrigid motion estimation through physics-based synthesis," *IEEE Pattern Analysis and Machine Intelligence*, 15(6):580–591, Jun. 1993. When s is defined using a series of composed functions, L is computed using the chain rule, allowing a more modular design of s.

As is often the case in a deformable model framework in a vision application, we simplify the dynamic equations of motion of the model to obtain:

$$\dot{q} = f_q, \ f_q = \int L(u)^T f(u) du \tag{3}$$

Using L, the three-dimensional applied forces f are converted to forces which act on q and are integrated over the model to find the total parameter force $f_q$.

When working with images, L must take the camera transformation and projection into account since two-dimensional image forces are applied to the three-dimensional model. Given a point on the model x, we can express this point in the coordinate system of the camera 10 (FIG. 11) as:

$$x_c(u) = c_c + R_c x(u) \quad (4)$$

where $c_c$ and $R_c$ are the translation and rotation of the camera frame with respect to the world frame. Under perspective projection (with a camera 10 having focal length f), the point $x_c(u)=(x_c,y_c,z_c)$ projects to the image point $x_p(u)=(x_p, y_p)^T = f/z_c(x_c,y_c)^T$. The values of $c_c, R_c$ and f can be determined prior to estimation using standard camera calibration techniques.

The velocities of model points projected onto the image plane, $\dot{x}_p$, can be found in terms of $\dot{x}$ using equation (4). The Jacobian $L_p$, which must be used in place of L in equation (3) to apply two-dimensional image forces onto the model, can be determined using equation (2):

$$\dot{x}_p(u) = \frac{\partial x_p}{\partial x_c} R_c \dot{x}(u) = \left(\frac{\partial x_p}{\partial x_c} R_c L(u)\right) \dot{q} = L_p(u) \dot{q} \quad (5)$$

The quantity $(\partial x_p/\partial x_c) R_c$ projects the columns of L (which are three-dimensional vectors) onto the image plane.

The distribution of forces on the model is based in part on forces computed from the edges of an input image. The next section describes how the present invention can augment this framework to accommodate optical flow information, where the projected velocities of the model $\dot{x}_p$ play an important role in its computation.

Optical Flow Integration

In the following, the theory for the integration of optical flow (step 123, FIG. 12) into a deformable model formulation is presented. The optical flow constraint equation, which expresses a constraint on the optical flow velocities, is reformulated as a system of dynamic constraints that constrain $\dot{q}$, the velocity of the deformable model.

The resulting information is combined with the model forces $f_q$ so that the constraint remains satisfied. Rather than explicitly computing the optical flow field, the optical flow constraint equation is used at a number of locations in the image to constrain the motion of the model. This greatly improves the estimation of q, the parameters of the deformable model.

Hard constraints on a dynamic system, which is the type of constraints the present invention uses, directly restrict the shape and motion, while soft constraints, such as a spring-force, bias the behavior of the system toward a certain goal involving the system energy. To ensure a hard constraint is satisfied, a constraint force is added to the system. This force must be determined at each iteration of the system.

Constraints which depend on q are holonomic constraints, and were first used in a deformable model formulation to add point-to-point attachment constraints between the parts of an articulated object (See, Metaxas and Terzopoulos). Non-holonomic constraints also depend on the velocity of the parameters $\dot{q}$, and cannot be integrated to determine q (Shabana, "*Dynamics of Multibody Systems,*" Wiley, 1989). A non-holonomic constraint C has the general form $$C(\dot{q},q,t)=0 \quad (6)$$

As discussed below, in the present invention, the optical flow constraints take the form of equation (6) and are found using the method of Lagrange multipliers.

Optical Flow Constraints

As noted by Horn, "*Robot Vision,*" McGraw-Hill, 1986, the optical flow constraint equation at a pixel I in the image I has the form:

$$[I_{xi} I_{yi}]\begin{bmatrix} u_i \\ v_i \end{bmatrix} + I_{ti} = 0 \quad (7)$$

where $I_x$, and $I_y$ are the spatial derivatives and $I_t$ is the time derivative of the image intensity. $u_i$ and $v_i$ are the components of the optical flow velocities.

For a model under perspective projection, the unique point $u_i$ on the model that corresponds to the pixel I can be determined, provided it is not on an occluding boundary. The crucial observation is that in a model based approach, $u_i$ and $v_i$ are identified with the components of the projected model velocities $\dot{x}_p (u_i)$:

$$\begin{bmatrix} u_i \\ v_i \end{bmatrix} = \dot{x}_p(u_i) = L_p(u_i) \dot{q} \quad (8)$$

The non-holonomic constraint equation for the optical flow at a point I in the image can be found by rewriting equation (7) using equation (8):

$$\nabla I_i L_p(u_i) \dot{q} + I_{ti} = 0 \quad (9)$$

where $\nabla I=[I_x,I_y]$. Instead of using this constraint at every pixel in the image, however, the present invention selects m pixels from the input image. A preferred method used to choose these particular points, and how to avoid some of the known difficulties in the computation of the optical flow in this model-based approach, are discussed below.

For the m chosen pixels in the image, the system of equations based on equation (9) becomes:

$$\begin{bmatrix} \nabla I_1 L_p(u_1) \\ \vdots \\ \nabla I_m L_p(u_m) \end{bmatrix} \dot{q} + \begin{bmatrix} I_{t1} \\ \vdots \\ I_{tm} \end{bmatrix} = 0 \quad (10)$$

which can be written compactly as $$B\dot{q}+g=0 \quad (11)$$

While building this system of equations, only the parameters in q which describe motion are included ($q_m$). The model shape parameters ($q_b$) are not directly used in and are not affected by the optical flow computation.

Solving the Dynamic System

The present invention solves the system of equations. (3) and (11) using the method of Lagrange multipliers as described by Shabana. The initial dynamic equation of motion (equation (3)) is modified by adding the constraint force $f_c$:

$$\dot{q} f_q + f_c \quad (12)$$

Adding $f_c$ ensures the constraint equation is satisfied, and cancels the components of $f_q$ that would violate the constraint. Using the Lagrange multiplier, $\lambda$, the constraint force can be solved for as:

$$f_c = -B^T \lambda \quad (13)$$

Figure 1:
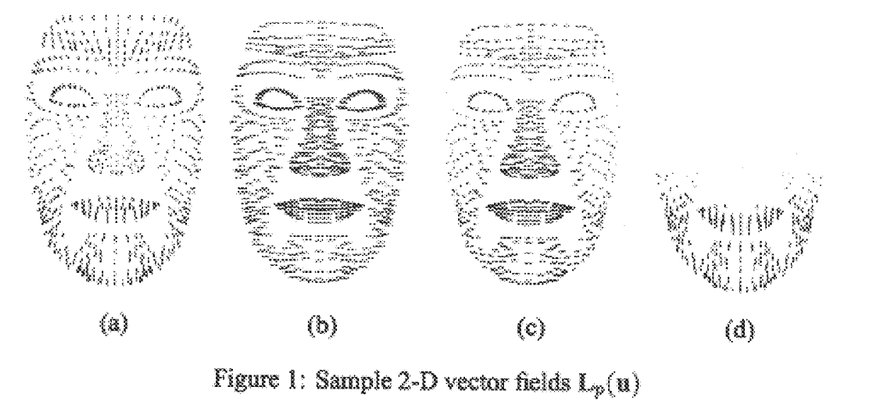
FIGS. 1A–1D show examples of vector fields for particular parameters of a face model, in accordance with a preferred embodiment of the present invention.

Equations (11), (12), and (13) are combined to form:

$$BB^T\lambda = Bf_q + g \quad (14)$$

and the constraint force is determined to be:

$$f_c = -B^+(Bf_q + g) = -B^+g - B^+Bf_q \quad (15)$$

where $B^+ = B^T(BB^T)^{-1}$ is the pseudo-inverse of B. As noted by Li et al., the first term in equation (15), $B^+g$, is a model-based linear least-squares solution to the optical flow constraint equations (11). To understand this term, consider how each column of $L_p(u)$ considered over the entire model, for all $u \in \Omega$, forms a 2-D vector field. Examples of these vector fields for particular parameters of the face model are displayed in FIGS. 1A–1D. FIG. 1A shows the vector field arising from translation in the z-direction, toward the camera 10. The focus of expansion can be seen in the center of the nose. The vector motion field for the x-direction of translation (horizontal) is shown in FIG. 1B, and rotation about the y-axis (about the vertical axis) is presented in FIG. 1C. FIG. 1D shows the motion vector field produced by the mouth-opening parameter. By computing $B^+g$, the present invention finds the vector field which best satisfies equations (11) in the least-squares sense. This 'best' vector field is a linear combination of the fields $L_{p0}(u)$ using the weights $-B^{+g}$.

When $f_q$ is added to $f_c$ in equation (12), the second term of equation (15), $B^+Bf_q$, cancels out the component of $f_q$ that would have violated the constraint (equations (11)) on $\dot{q}$. $B^+B$ is the identity when the columns of B are linearly independent but in this case is singular due to the aperture problem since B was constructed using equation (7) (See, Horn; See, Simoncelli, Adelson, and Heeger, "Probability distributions of optical flow," *Proceedings CVPR '91*, pages 310–315, 1991). The optical flow constraint on $\dot{q}$ will be inaccurate due to errors in estimation, so it is desirable to only have a partial cancellation of $f_q$. The present invention re-weighs the components of $B^+Bf_q$ given the least-squares error residuals of the optical flow for each parameter (See, Simoncelli, Adelson, and Heeger). This results in a smaller amount of cancellation of $f_q$ given a larger residual for a particular parameter.

The edge forces in $f_q$ keep the model properly aligned with the face in the image by preventing small errors in q from accumulating (due to the integration over time of $\dot{q}$). In other words, most of the tracking is performed by the optical flow constraint term, while the edge forces prevent the model from 'wandering off'.

Face Modeling

Figure 2:
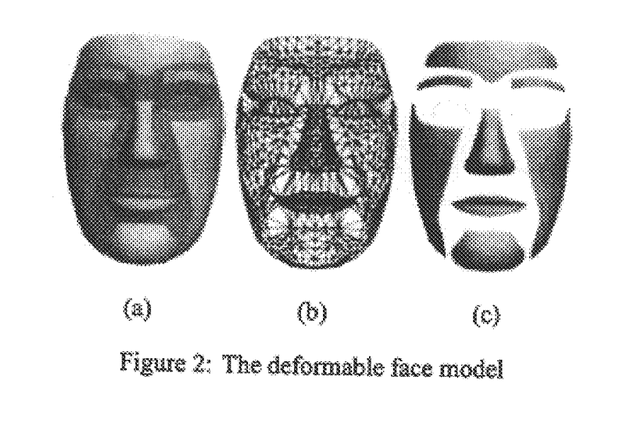
FIGS. 2A–2C show a deformable face model developed in accordance with a preferred embodiment of the present invention.

The deformable face model developed by the present invention (step 122, FIG. 12) is shown in FIG. 2A. The model includes a polygon mesh, shown in FIG. 2B, formed from ten component parts, each shown in FIG. 2C. The shape of the face model in rest position is formed using a set of parameterized deformations specified by the parameters $q_b$ (step 131, FIG. 13). The motion of the face model (such as facial expressions) uses a separate set of deformations specified by the parameters $q_m$ (step 132, FIG. 13). Model tracking is facilitated by modeling the shape of the face separately from the motion of the face.

Anthropometry

Anthropometry is used to classify human body geometry using a series of measurements. The construction of the face model of the present invention is in part motivated by anthropometry studies of the human face by Farkas, "*Anthropometry of the Head and Face*," Raven Press, 1994). The present invention uses anthropometry data to produce an initial model, and also for maintaining consistency of relationships between parameters in $q_b$.

Face anthropometry measurements use a set of predetermined landmarks, such as the corners of the lips, and the tip of the nose, and the following types of measurements:

- distance between two landmarks, such as the separation of the eyes;
- distance between two landmarks measured along an axis, such as the vertical height of the nose;
- distance between two landmarks measured along a surface, such as the upper lip boundary arc length;
- angle of inclination with respect to an axis, such as the slope of the nose bridge; and
- angle between face locations, such as the angle formed at the tip of the nose, among others.

A complete set of measurements for a particular person, including approximately 100 individual measurements, is obtained (step 141, FIG. 14) (See, Farkas) and averaged with the measurements from a large number of individuals. For any of the types of measurements mentioned above, three-dimensional spring-like forces (i.e, a soft constraint) can be determined and applied to the polygonal face model that softly enforce a measurement on the model. The present invention uses such forces to construct the initial shape of the model, as will be discussed below (steps 142–144, FIG. 14). For some of the measurements, correlation information is also available. During estimation, spring-like forces can be used to bias the model to agree more with such correlation information. such forces only affect the parameters in $q_b$.

Model Deformations

Due to variabilities observed in the anthropometric measurements, the present invention employs deformations to construct the face model. The variations in the face are captured using a number of deformations: translation, rotation, scaling, and bending. Each deformation is specified by a small number of parameters, and is applied to a particular set of face parts, ranging from a single part to the entire face. Preferably, the deformations are carefully combined to produce a parameterized face model.

Rigid deformations such as translation and rotation are used for the placement of parts on the face. Scaling and bending deformations, as shown in FIGS. 3A–3D, allow the model to cover a wide variety of faces. These deformations are defined with respect to particular landmark locations in the face mesh. By fixing the deformations into the mesh, the desired effect of any particular deformation is not lost due to the presence of other deformations, especially inasmuch as the landmark points are deformed along with the rest of the mesh.

Figure 3:
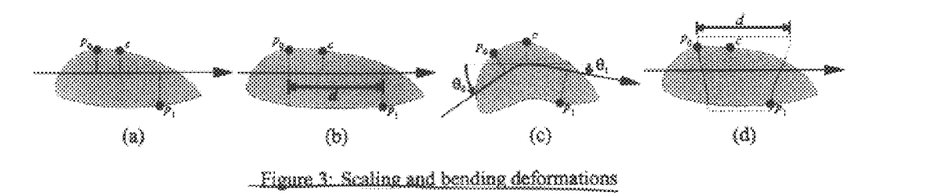
FIGS. 3A–3D show scaling and bending deformations which allow the model to cover a wide variety of faces, in accordance with a preferred embodiment of the present invention.

A shape before deformation which contains the landmark points $p_0$, $p_1$ and c is shown in FIG. 3A. FIG. 3B shows the effect of scaling this shape along the displayed axis. The center point c is a fixed point of the deformation, while the region between $p_0$ and $p_1$ is scaled to have length d, the parameter of the scaling deformation. Portions of the shape outside this region are rigidly translated.

Bending is applied in FIG. 3C, and shows the effect of bending the shape in FIG. 3A in a downward direction. The bending is applied to the area between $p_0$ and $p_1$, where c is the center of the bending. Outside this area, the shape is rotated rigidly. Each plane perpendicular to the bending axis is rotated by an angle determined by the distance of this plane to the center point c. The amount of bending is specified by the parameters $\theta_0$ and $\theta_1$, which specify the rotation angle at $p_0$ and $p_1$, respectively.

Preferably, the spatial extent of each deformation can be localized, as shown in FIG. 3D. The influence of the scaling deformation varies in directions perpendicular to the axis, producing a tapering effect. Near the top of the shape, the object is fully scaled to be the length d, while the bottom of the object is unaffected by the deformation. The ability to restrict the effect of a deformation is vital in specifying the variations of shape seen in the face.

Face Shape

Preferably, the deformations are used to create the model, which as is shown in FIGS. 2A–2C is a polygon mesh having ten parts. Such parts include the nose, mouth, eyes, and other facial parts. Of course, one skilled in the art will recognize that other parts and other numbers of parts may be employed without departing from the spirit and scope of the present invention. Preferably, the parts are connected together to form a single mesh, where the gaps between the parts are closed by a mesh 'zippering' process. The additional mesh faces added during such gap closing are used for visibility checking and occluding contour determination, as will be discussed below.

Rather than describing the entire model, which would be extremely lengthy and not particularly enlightening, a short description is provided which illustrates the concepts necessary for model construction. The model preferably assumes the subject is not wearing eyeglasses, and does not have large amounts of facial hair such as a beard or mustache. However, one skilled in the art will recognize that the model may be modified to take such features and other features into account, if so desired, without departing from the spirit and scope of the present invention.

Figure 4:
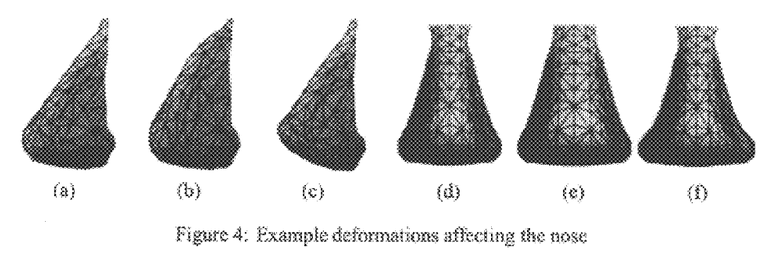
FIGS. 4A–4F show deformations applied to the nose, in accordance with a preferred embodiment of the present invention.
Figure 5:
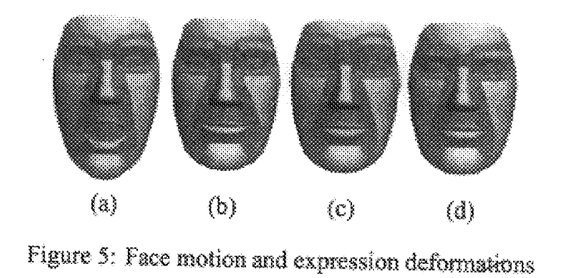
FIGS. 5A–5D show modeled expressions, in accordance with a preferred embodiment of the present invention.

The deformations described above are preferably manually specified by a model designer. For example, some of the deformations applied to the nose are shown in FIGS. 4A–4F. FIGS. 4A and 4D show two views of the default nose. FIG. 4B shows a nose deformed using vertical scaling, while the pulled-up nose in FIG. 4C is produced using a localized bending deformation. FIGS. 4E and 4F show localized scaling affecting the width of the nose in different places.

As with the nose, each of the other parts preferably have their own set of deformations defined. Deformations can also affect several parts, such as the lower-face shape deformations that affect the chin and both cheeks. In the present invention, all of the approximately 80 parameters employed to describe the shape of the face at rest are collected together into $q_b$. An anthropometrically 'average' model such as that shown in FIG. 2A is preferably constructed by applying spring-like anthropometry forces to the model for each measurement, using data from a set of averaged measurements. This produces a reasonable model which can be used for initialization.

Face Motion

The deformations corresponding to motions, including motions such as facial expressions, are modeled using the same techniques used for face shape. The motion deformations are applied (step 134, FIG. 13) to the face in rest position, i.e. after the shape deformations (step 133, FIG. 13). The modeled expressions are displayed in FIGS. 5A–5D. The model is preferably capable of opening the mouth, smiling, raising each eyebrow, and frowning each eyebrow, as shown in FIGS. 5A–5D, respectively. This results in a total of 6 expression parameters, each corresponding to a particular FACS action unit described by Ekman and Friesen, "*The Facial Action Coding System,*" Consulting Psychologist Press, Inc., 1978.

The construction of expressions is preferably simplified by decomposing each face motion into several components. For example, the mouth opening deformation is decomposed into chin/cheek bending, lip scaling and lip translation. To facilitate tracking of these expressions, there is preferably a single control parameter for each expression which uniquely determines all of the component parameters. Given a particular face motion which is constructed using a series of deformations with parameters $b_i$, the control parameter e determines the value $b_i$ based on the formula:

$$b_i = s_i e \qquad (16)$$

where $s_i$ is the scaling parameter used to form the linear relationship between $b_i$, and e. These scaling parameters are preferably constants determined by a model designer during construction of the model.

The set of face motion parameters $q_m$ consists of the control parameters for each of the expressions, which are initially all zero. The parameters $b_i$ are not estimated, but are determined by equation (16) using the estimated value of e. Also included in $q_m$ are the translation and rotation parameters from equation (1) which specify the pose of the head.

Face Feature and Edge Determination

Figure 6:
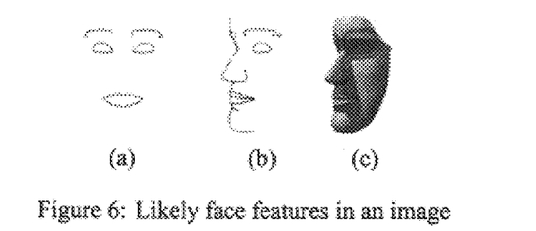
FIGS. 6A–6C show marked feature edges in a polygon mesh, in accordance with a preferred embodiment of the present invention.
Figure 15:
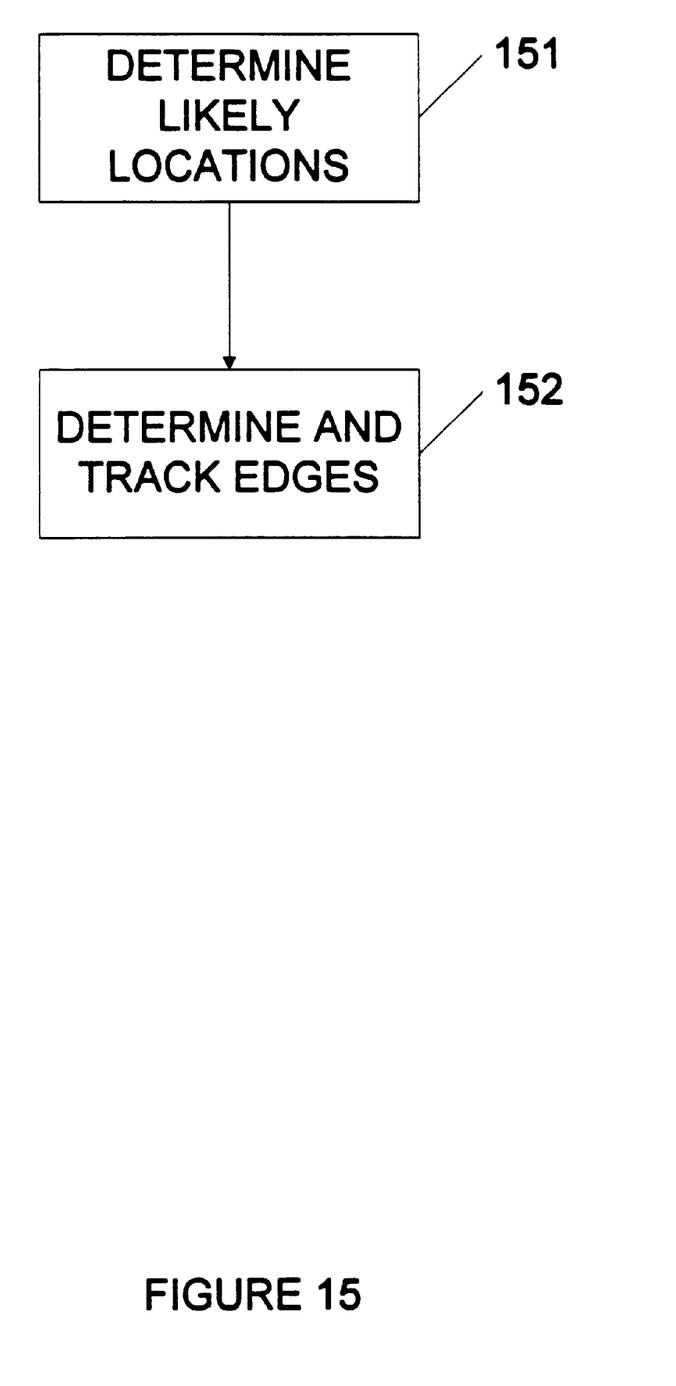

The tracking of edges in a deformable model framework is facilitated by knowing what locations of the face model are likely to produce edges in an image (steps 151–152, FIG. 15). In a preferred embodiment of the present invention, the particular features chosen are the boundary of the lips and eyes, and the top boundary of the eyebrows. Edges in the polygon mesh which correspond to these features are preferably marked during model construction, and are shown in FIG. 6A. Other likely candidates for producing edges are the regions on the model of high curvature. The base of the nose and indentation on the chin are examples of high curvature edges, as can be seen in FIG. 6B.

Occluding boundaries on the model also produce edges in the image, as seen in FIG. 6C, and can be determined from the three-dimensional model based on the camera coordinate transformation in equation (4). The location of occlusion boundaries on the model will be useful in determining where to measure optical flow, as will be described below.

Of course, for an edge to be produced in an image, the corresponding region on the face must be visible to the imaging camera 10. Visibility checks are performed using the model and camera transformation. The model depth information ($z_c$) can be used to determine the parts of the model that are visible to the camera 10 (i.e, the front-most regions of the model). FIG. 6B shows visible locations of the model (i.e. features, high curvature and occluding edges) that are likely to produce edges, given the model in FIG. 6C. Once the locations on the model are known which are likely to produce image edges, 2-D edge-based forces (See, Metaxas and Terzopoulos) preferably are applied to the model, and will contribute to the value of $f_q$ (affecting parameters in both $q_b$ and $q_m$) based on eq. (3). These edge forces 'pull' the model so that the model edges become aligned with their corresponding image edges.

Implementation

As should now be understood, the motion estimation process of the present invention is greatly improved due to the presence of a 3-D model with a small number of motion parameters. For the same reasons, it can now be seen that many of the problems associated with optical flow computation, such as the aperture problem or unreasonable smoothness assumptions, can be avoided to some degree.

Figure 11:
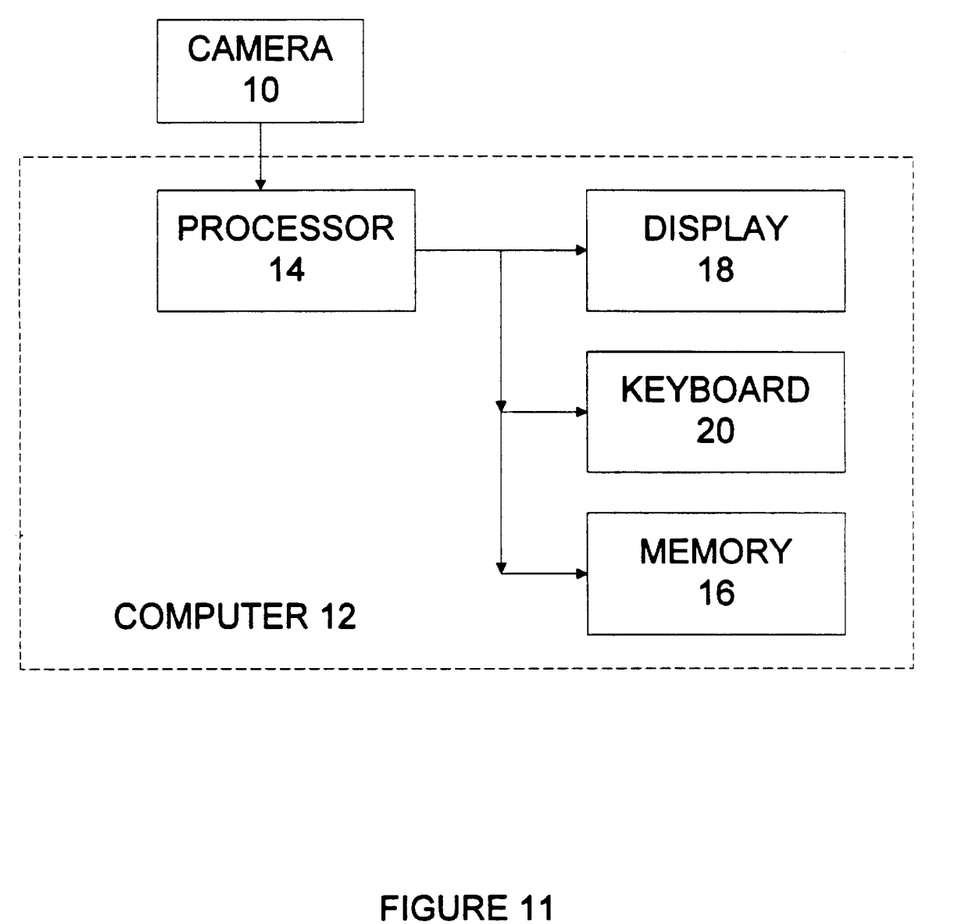
FIG. 11 is a block diagram showing the hardware elements, in accordance with a preferred embodiment of the present invention.

As shown in FIG. 11, the present invention requires the use of an appropriate processor 14 for computational purposes and a camera 10 coupled to the processor 14 for recording facial images and providing such recorded images to the processor 14. Preferably, the processor 14 is incorporated within any of a variety of computers 12, including but not limited to a personal computer or mainframe computer. Typically, the computer 12 has a memory 16, a display 18, a keyboard 20, and other necessary computational elements. Preferably, the computer 12 has sufficient computing power to perform the above-described face shape and motion estimation in a reasonable period of time. Also preferably, the camera 10 is a digital or analog video camera that can provide multiple pixilated images to the processor in a reasonable period of time. The camera 10 and processor 14 may be local to or remote from each other, and in either case connected by an appropriate linkage. One skilled in the art will recognize, then, that the present invention does not specify any particular processor 14 or camera 10, and that in fact other types of hardware may be employed without departing from the spirit and scope of the present invention.

Figure 12:
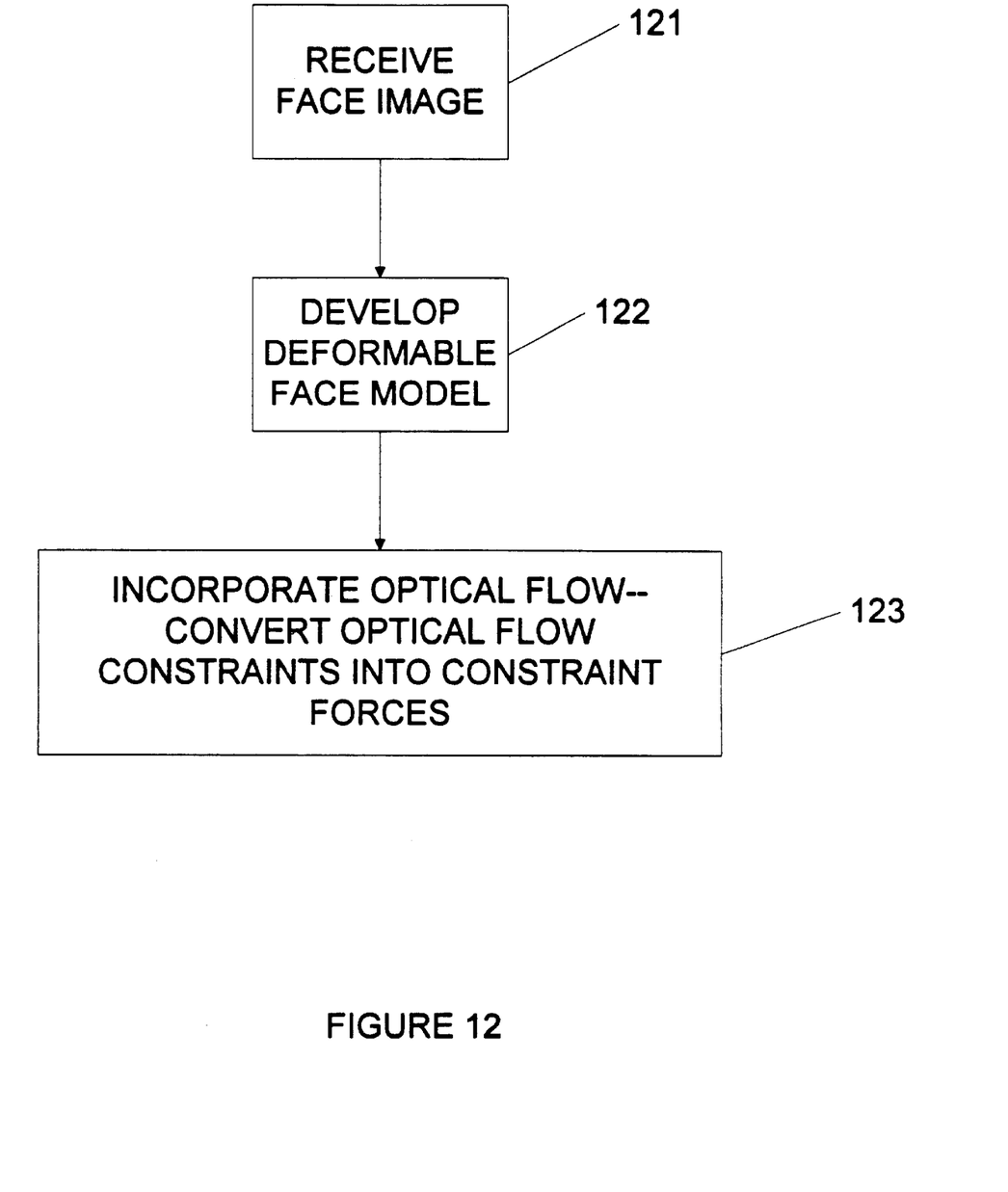
FIGS. 12–15 are flow diagrams illustrating methods employed in developing a deformable face model, in accordance with a preferred embodiment of the present invention.
Figure 13:
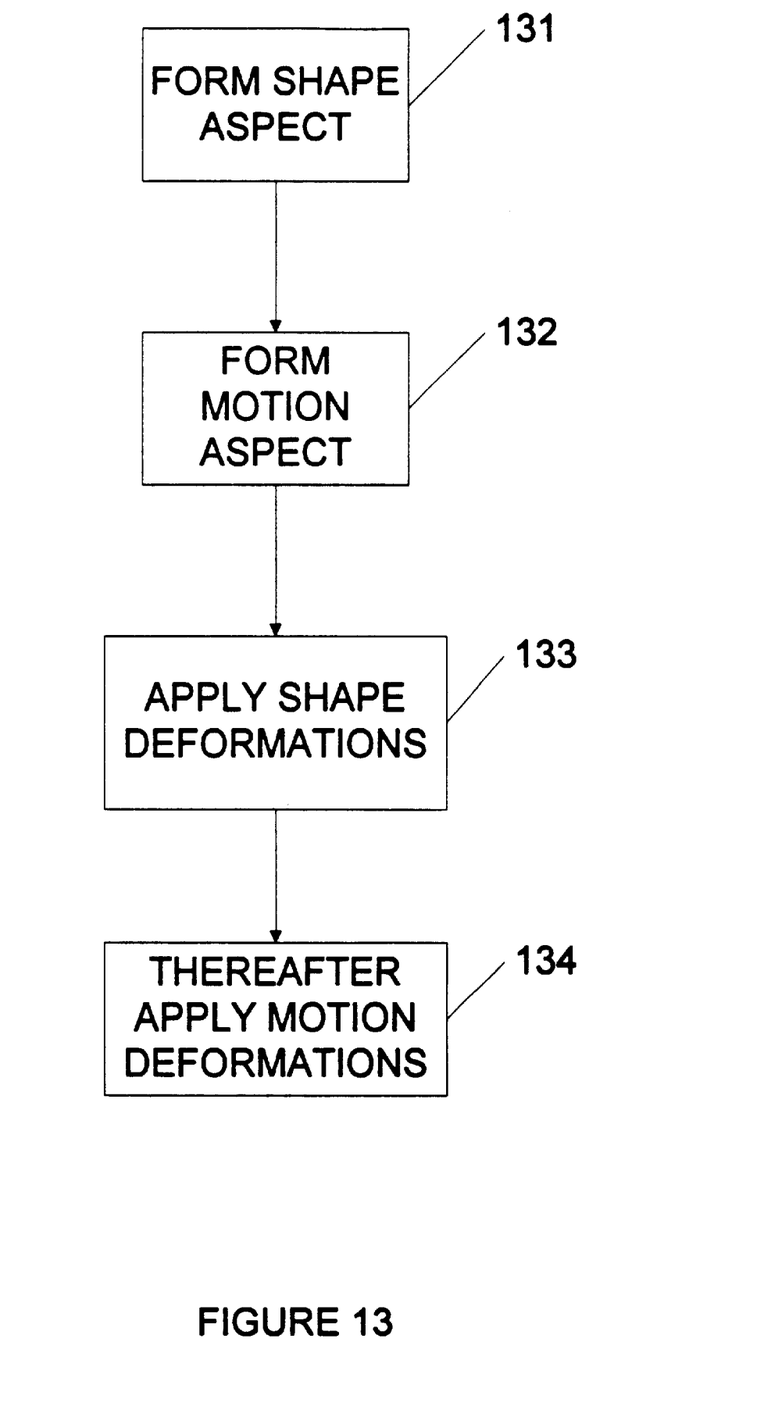

Briefly, and as seen in FIG. 12, to estimate human face shape and motion, an image of a face is received (step 121), a deformable face model of the face is developed (step 122), and optical flow is incorporated as a constraint in the model (step 123). As seen in FIG. 13, in developing the model, model shape aspects are formed in a rest position using a set of parameterized shape deformations (step 131), and model motion aspect are formed using a separate set of parameterized motion deformations (step 132). shape deformations are applied to the model first (step 133), and thereafter motion deformations are applied to the model (step 134).

Figure 14:
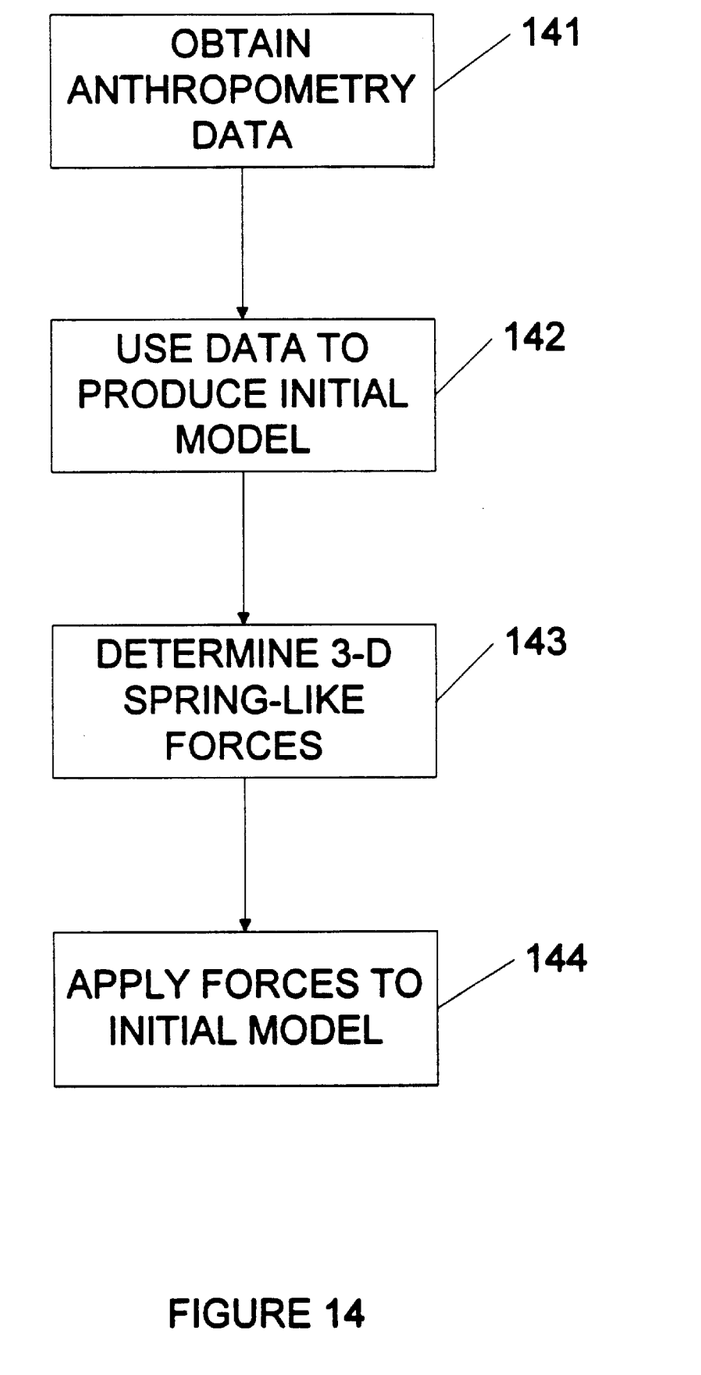

Referring now to FIG. 14, a set of anthropometry data is obtained for the face (step 141), and such anthropometry data is used to produce an initial model (step 142). Thereafter, for at least one of the anthropometry data, three-dimensional spring-like forces are determined (step 143), and the determined forces are applied to the initial model to construct the initial shape of the model (step 144). During image tracking, locations of the model that are likely to produce edges in an image are determined (step 151), and edges in the image based on the determined locations are likewise determined and tracked (step 152).

In accordance with the invention, the selection of m image points for optical flow measurement in equation (10) is preferably made partially using geometric information from the 3-D face model. This helps in determining favorable and unfavorable locations to measure optical flow information. As one skilled in the art will appreciate, without a model, solutions to equation (7) often require smoothness conditions be imposed so that a solution can be found (See, Horn). However, this is complicated by the fact that occlusion boundaries violate equation (7) and also must be located to determine where to relax the smoothness conditions. Finding likely locations of occlusion boundaries in the image was described above. Clearly, any chosen image point should not be on or nearby one of such boundaries.

The flow velocities in equation (7) are best determined in locations where the image gradient is significant. As should be understood, locations where edges are likely to be found in the image should have such significant gradient magnitude. Points in the image which are local maxima of the gradient magnitude and are also on the face, and not near occlusion boundaries, can also be chosen.

Preferably, and importantly, there should be enough optical flow measurements for each parameter, since not all motion parameters are defined over the entire face. For example, the mouth-opening motion in FIG. 1D is non-zero only in the jaw region. For each motion parameter, the present invention preferably ensures that the number of pixels chosen in the region of influence of that parameter does not fall below some minimum value, multiplied by the percentage of the portion of the region that is visible. Such minimum value may be empirically determined, and can range from 10 to 20 pixels for the expression deformations (i.e., eyebrow and mouth motions). In total, m is usually around 100 pixels.

The quality of the tracking is sensitive to the filters used to compute the optical flow information. It has been found that the matched pairs of derivative filters and low-pass pre-filters presented by Simoncelli ("Design of multi-dimensional derivative filters," ICIP '94, 1994) are superior to other filters, such as those using binomial coefficients.

To find $B^+$ in equation (15), the present invention preferably computes the singular value decomposition of B (Press, et al. *Numerical Recipes in C: The Art of Scientific Computing*. Cambridge University Press, 1992). Each motion parameter in q will have a corresponding singular value. When one of such parameters is zero (or nearly zero), it is interpreted as a lack of motion in that particular parameter. The zero singular value could also be caused by a poor choice of image points used to sample the optical flow information. The aperture problem, where the motion of a particular parameter cannot be estimated using optical flow information is not likely to be the cause since no local computation is made using the optical flow.

For each of several iterations, the present invention first finds the solution to the optical flow constraint using equations (11). The edge forces that affect $q_m$ are determined, given the model in this new position (using the term $B_+g$ in equation (15)). $q_m$ is then updated by applying the modified dynamic equations of motion (equation (12)). As a separate step, to further improve shape estimation, edge forces are applied that update the shape of the model $q_b$, while the anthropometry forces keep the shape consistent. The motion parameters $q_m$ are not affected during this step. Over time, features become integrated as they become visible due to face motion.

EXAMPLES

The entire process of shape and motion estimation is automatic, except for the initialization. To initialize the model, the subject is preferably at rest and facing forward (approximately), as in FIG. 7A. Once the face image has been received (step 121, FIG. 12), in the first frame of the image sequence, eyebrow centers, eye corners, nose tip, mouth corners, and perhaps other features are manually marked. The problem of automatically locating the face and its various features has been addressed elsewhere (See, Yacoob and Davis; See, Yuille, Cohen, and Halliman, "Feature extraction from faces using deformable templates," *International Journal of Computer Vision*, 8:104–109, 1992).

Using the marked features, forces are applied to the initial face model, as was described above, to pull the corresponding points on the face toward the desired locations in the image. In the first stage, shown in FIG. 7B, the rotation and translation of the model are determined, as well as course-scale face shape parameters, such as those which determine the positions and sizes of the face parts.

Figure 7:
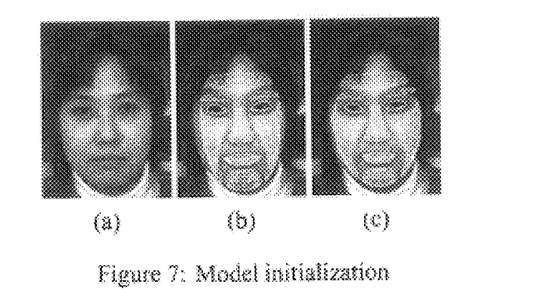
FIGS. 7A–7C show initiation of a model, in accordance with a preferred embodiment of the present invention.
Figure 8:
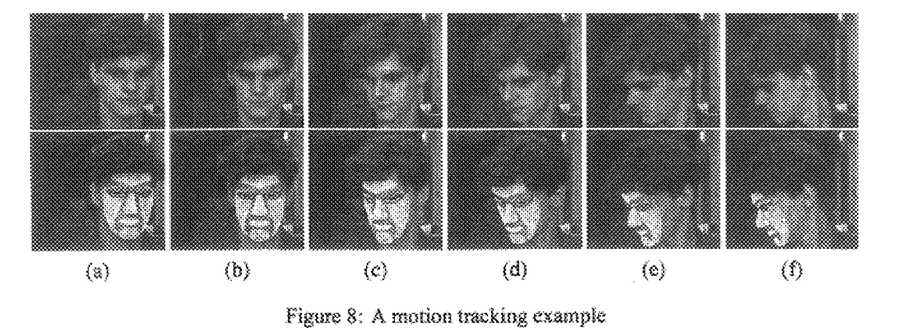
FIGS. 8A–8F, 9A–9F, and 10A–10F each show several frames from tracking examples, in accordance with a preferred embodiment of the present invention.

Once roughly in place, edge forces are applied that pull the face into the correct shape while anthropometry forces keep the shape in agreement with the correlation data, as in FIG. 7C. The translation from the initial face to the camera 10 is determined given the assumption that the subject's face is the same size as the model. During motion estimation, the subject preferably does not make face expressions not yet achievable by the face model, such as a pout. The image velocity of the subject also cannot exceed a certain threshold.

FIGS. 8A–8F, 9A–9F, and 10A–10F each show several frames from tracking examples. Each frame includes the original frame (above) and the original frame shown with the estimated face superimposed (below). In each case, a model initialization is performed as described above. The initialization process usually takes about 2 minutes of computation on a 200 MHZ SGI. Afterwards, processing each frame takes approximately 3 seconds each, again on a 200 MHZ SGI.

FIGS. 8A–8F show frames from a sequence where the subject rotates his head by a large amount. The face motion is successfully tracked given this significant rotation and self-occlusion. In a comparison of the extracted basic face shape with a 3-D range scan of the subject's face, where the extracted face was manually scaled by a small amount to eliminate the depth ambiguity, it was found that the RMS deviation between these two shapes was 1.5 cm for FIG. 8A and 0.70 cm for FIG. 8F. The marked improvement in the face shape was due to additional shape information becoming available as the subject turned his head, such as on the nose and chin.

Figure 9:
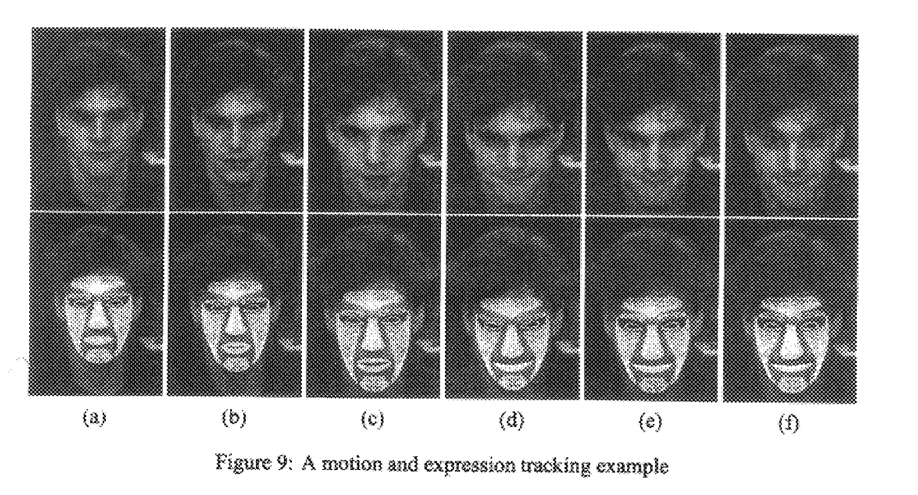
Figure 10:
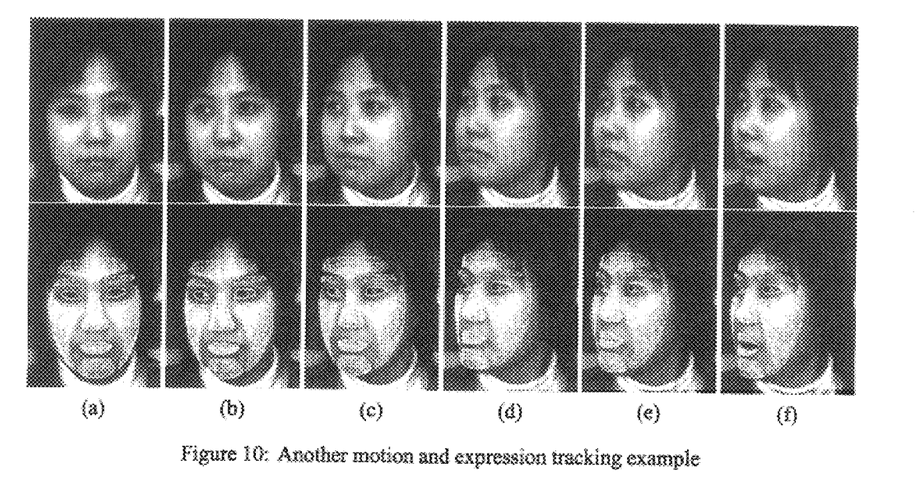

FIGS. 9A–9F show the same subject making a series of face motions: opening the mouth in FIGS. 9B and 9C, smiling in FIGS. 9D and 9E, and raising the eyebrows in FIGS. 9E and 9F. In each case, the motion parameter values change appropriately, and at the correct times, as can be noted by observing the alignment of the face mask with the image features.

FIGS. 10A–10F show a different subject with a different face shape turning her head and opening her mouth from FIGS. 9D–9F. The face model is able to capture the different shape of her face, as well as the motion. The RMS deviation is 1.7 cm for FIG. 9A and 0.83 cm for FIG. 9F.

The good tracking performance of the model of the present invention is due to the combination of optical flow constraints and edge forces, as well as the small number of parameters in the model. If the edge forces are disabled (for $q_m$ only), errors in the estimation of $\dot{q}$ accumulate, causing the model to eventually lose track. Using edge forces alone, without optical flow information, is a much harder problem, since edge forces are most effective only when the model is very close to the solution. In such a situation, the model also loses the advantage of having a constraint on the motion. The parameters of the model do not have orthogonal effects. Locally, the motion due to one parameter can be very much like motions due to other parameters, such as in FIGS. 1B and 1C where the motions on the vertical mid-line of the face are nearly identical. The constraint solution above takes a global view of the problem, finding the best combination of parameter velocities that add up to the desired motion. Edge forces affect all parameters which locally produce the desired motion. The system eventually equilibrates, perhaps to a solution which reflects the fact that there is no 'penalty' for having the forces locally disagree with the produced motion. Parameter scheduling techniques have been developed (DeCarlo and Metaxas, "Blended deformable models," *Proceedings CVPR '94*, pages 566–572, 1994) that provide a specified order and scale for a set of parameters, but only relieve this problem to a certain extent.

CONCLUSION

In the present invention, a deformable model framework treats optical flow information as a non-holonomic constraint on a model. When combined with other information such as edge forces, the estimation results that are obtained are greatly improved. The present invention also provides a 3-D face model which can represent a wide variety of faces and facial motions. Problems such as self-occlusion or error accumulation in tracking are alleviated by the use of such model. Given the small number of parameters used in the face shape and motion of the model, face or expression recognition is achievable.

It should be appreciated by those skilled in the art that changes could be made to the embodiments described above without departing from the inventive concepts thereof. For example, motion prediction and multi-scale optical techniques may be used to allow for the tracking of rapid motions. Also, large improvements could come from better methods for the selection of the points where the optical flow information is sampled. It is understood, therefore, that this invention is not limited to the particular embodiments disclosed, but it is intended to cover modifications within the spirit and scope of the present invention as defined by the appended claims.

What is claimed is:

1. A method for human face shape and motion estimation comprising the steps of:
   receiving an image of a face;
   developing a deformable face model of the face, the model having a plurality of parameters and a three-dimensioned velocity, each parameter having a velocity;
   incorporating optical flow as a constraint in the model by providing a system of optical flow constraints in terms of the parameters of the model, the optical flow constraints including image velocities which are identified with a projection of the three-dimensional velocity of the model;
   incorporating edge forces on the model by determining likely locations of edges in the image; and
   combining the optical flow constraints with the edge forces.

2. The method of claim 1 wherein the incorporating step includes the step of employing Lagrange multipliers to convert the optical flow constraints into constraint forces.

3. The method of claim 1 wherein the developing step comprises the step of generating a model which includes a polygon mesh formed from a number of pre-determined component parts.

4. The method of claim 3 wherein the developing step comprises the step of generating a model having shape and motion aspects, the shape aspect being formed in a rest position using a set of parameterized shape deformations, and the motion aspect being formed using a separate set of parameterized motion deformations.

5. The method of claim 4 wherein the developing step further comprises the steps of:
   using deformations selected from a group consisting of translation, rotation, scaling, bending, and combinations thereof; and
   defining the deformations with respect to particular landmark locations in the face mesh to fix the deformations into the mesh.

6. The method of claim 4 further comprising the steps of:
   applying shape deformations to the model; and
   thereafter applying motion deformations to the model.

7. The method of claim 1 wherein the developing step comprises the steps of:
   obtaining a set of anthropometry data for the face;
   using the anthropometry data to produce an initial model;
   determining for at least one of the anthropometry data three-dimensional spring-like forces; and applying the determined forces to the initial model to construct the initial shape of the model.

8. The method of claim 1 further comprising the step of:
determining and tracking edges in the image based on the determined locations.

9. The method of claim 1, wherein the combination of the optical flow constraints with the edge forces does not disturb the optical flow constraints.

10. An apparatus for performing human face shape and motion estimation comprising:

a camera which receives an image of a face; and a processor which receives face images from the camera, the processor developing a deformable face model of the face from the received images, the model having a plurality of parameters and a three-dimensional velocity, each parameter having a velocity, the processor further incorporating optical flow as a constraint in the model by providing a system of optical flow constraints in terms of the parameters of the model, the optical flow constraints including image velocities which are identified with a projection of the three-dimensional velocity of the model; and the processor further incorporating edge forces on the model by determining likely locations of edges in the image, and combining the optical flow constraints with the edge forces.

11. The apparatus of claim 10 wherein the processor employs Lagrange multipliers to convert the optical flow constraints into constraint forces.

12. The apparatus of claim 10 wherein the processor generates a model which includes a polygon mesh formed from a number of pre-determined component parts.

13. The apparatus of claim 12 wherein the model generated by the processor has shape and motion aspects, the shape aspect being formed in a rest position using a set of parameterized shape deformations, the motion aspect being formed using a separate set of parameterized motion deformations.

14. The apparatus of claim 13 wherein the processor uses deformations selected from a group consisting of translation, rotation, scaling, bending, and combinations thereof, and wherein the processor defines the deformations with respect to particular landmark locations in the face mesh to fix the deformations into the mesh.

15. The apparatus of claim 13 wherein the processor applies shape deformations to the model and thereafter applies motion deformations to the model.

16. The apparatus of claim 10 wherein the processor uses an obtained set of anthropometry data for the face to produce an initial model, determines for at least one of the anthropometry data three-dimensional spring-like forces, and applies the determined forces to the initial model to construct the initial shape of the model.

17. The apparatus of claim 10 wherein the processor determines and tracks edges in the image based on the determined locations.

18. The apparatus of claim 10 wherein the combination of the optical flow constraints with the edge forces does not disturb the optical flow constraints.

* * * * *

UNITED STATES PATENT AND TRADEMARK OFFICE
CERTIFICATE OF CORRECTION

PATENT NO.    : 6,492,986 B1
DATED         : December 10, 2002
INVENTOR(S)   : Dimitris Metaxas and Douglas DeCarlo It is certified that error appears in the above-identified patent and that said Letters Patent is hereby corrected as shown below:

<u>Column 6,</u>
Line 2, delete "Hom" and insert -- Horn --;

<u>Column 7,</u>
Line 24, delete "$L_pO$" and insert -- $L_p$ --;

<u>Column 12,</u>
Line 27, delete "$B_+g$" and insert -- $B^+g$ --.

Signed and Sealed this

Second Day of March, 2004

JON W. DUDAS
*Acting Director of the United States Patent and Trademark Office*